United States Patent
Oikawa

(10) Patent No.: US 9,737,828 B2
(45) Date of Patent: Aug. 22, 2017

(54) CRYOPUMP HAVING INLET CRYOPANEL EXTENSION

(71) Applicant: SUMITOMO HEAVY INDUSTRIES, LTD., Tokyo (JP)

(72) Inventor: Ken Oikawa, Tokyo (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 562 days.

(21) Appl. No.: 13/757,123

(22) Filed: Feb. 1, 2013

(65) Prior Publication Data

US 2013/0199210 A1   Aug. 8, 2013

(30) Foreign Application Priority Data

Feb. 2, 2012 (JP) ................. 2012-021289

(51) Int. Cl.
*F04B 37/08* (2006.01)
*B01D 8/00* (2006.01)

(52) U.S. Cl.
CPC ............. *B01D 8/00* (2013.01); *F04B 37/08* (2013.01)

(58) Field of Classification Search
CPC .......... B01D 8/00; F04B 37/08; F04B 37/085; Y10S 417/901; F25B 9/14; F25B 9/10
USPC ........................................... 62/55.5
See application file for complete search history.

(56) References Cited

U.S. PATENT DOCUMENTS

| | | | | |
|---|---|---|---|---|
| 3,785,162 A | * | 1/1974 | Long et al. | 62/55.5 |
| 4,277,951 A | * | 7/1981 | Longsworth | 62/55.5 |
| 4,555,907 A | * | 12/1985 | Bartlett | 62/55.5 |
| 4,655,046 A | * | 4/1987 | Eacobacci et al. | 62/55.5 |
| 4,918,930 A | | 4/1990 | Gaudet et al. | |
| 5,137,050 A | * | 8/1992 | Clarke et al. | 137/541 |
| 5,301,511 A | * | 4/1994 | Bartlett et al. | 62/55.5 |
| 5,343,708 A | | 9/1994 | Gaudet et al. | |
| 5,450,316 A | | 9/1995 | Gaudet et al. | |
| 5,483,803 A | | 1/1996 | Matte et al. | |
| 5,782,096 A | * | 7/1998 | Bartlett et al. | 62/55.5 |
| 7,320,224 B2 | * | 1/2008 | Ash | F04B 37/08 62/55.5 |
| 2007/0125112 A1 | * | 6/2007 | Tsuyuki | 62/55.5 |
| 2010/0011784 A1 | | 1/2010 | Longsworth | |
| 2012/0222431 A1 | | 9/2012 | Tanaka | |

FOREIGN PATENT DOCUMENTS

| | | |
|---|---|---|
| CA | 1322105 C | 9/1993 |
| DE | 19881966 T1 | 12/1999 |
| JP | 2008-223538 A | 9/2008 |
| JP | 2010-025113 A | 2/2010 |
| TW | 200708665 A | 3/2007 |
| WO | WO-2011/055465 A1 | 5/2011 |

* cited by examiner

*Primary Examiner* — Etsub Berhanu
*Assistant Examiner* — Nelson Nieves
(74) *Attorney, Agent, or Firm* — Michael Best & Friedrich LLP

(57) ABSTRACT

A cryopump includes a low-temperature cryopanel, a high-temperature cryopanel provided outside the low-temperature cryopanel, and a housing provided outside the high-temperature cryopanel. The high-temperature cryopanel includes an extension panel extending outward. The housing includes an inlet flange surrounding the extension panel.

11 Claims, 4 Drawing Sheets

CRYOPUMP HAVING INLET CRYOPANEL EXTENSION

BACKGROUND OF THE INVENTION

1. Field of the Invention

The present invention relates to a cryopump.

2. Description of the Related Art

There is a cryopump including a housing having a close fit around a warm cryopanel and having a first inner diameter, an inlet array that fits inside the housing, a flange that attaches the housing to a gate valve having a second inner diameter, and a bracket extension that is attached to the inlet array and extends the inlet array above the flange, wherein the second inner diameter is larger than the first inner diameter.

SUMMARY OF THE INVENTION

According to an aspect of the present invention, there is provided a cryopump including: a housing including a tubular portion extending in an axial direction toward an inlet of the cryopump; a flange including an inner periphery portion and an outer periphery portion, the inner periphery portion being provided on an outer side, in a radial direction, of an opening end of the tubular portion, the outer periphery portion being configured to attach the cryopump; and an inlet cryopanel positioned at the inlet, wherein the inlet cryopanel includes an extended portion outside the tubular portion in the radial direction, the inner periphery portion and the outer periphery portion form a height difference therebetween in the axial direction, and the inlet cryopanel is surrounded by the flange with a clearance in the axial direction formed between the extended portion and the inner periphery portion and with a clearance in the radial direction formed between the extended portion and the outer periphery portion.

According to another aspect of the present invention, there is provided a cryopump including: a low-temperature cryopanel; a high-temperature cryopanel provided outside the low-temperature cryopanel; and a housing provided outside the high-temperature cryopanel, wherein the high-temperature cryopanel includes an extended portion extending outward, and the housing includes a stepped flange surrounding the extended portion.

According to yet another aspect of the present invention, there is provided a cryopump including: a housing including a tubular portion extending in an axial direction toward an inlet of the cryopump; an inlet cryopanel positioned at the inlet; and a shield panel that extends in the axial direction inside the tubular portion, a gap in the axial direction formed between the shield panel and the inlet cryopanel, wherein the inlet cryopanel includes a skirt for covering the gap.

According to still another aspect of the present invention, there is provided a cryopump including: a low-temperature cryopanel; and a high-temperature cryopanel provided outside the low-temperature cryopanel, wherein the high-temperature cryopanel comprises an inlet cryopanel and a shield panel, a gap formed between the inlet cryopanel and an opening end of the shield panel, and the inlet cryopanel includes a skirt for restricting a flow of gases through the gap.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
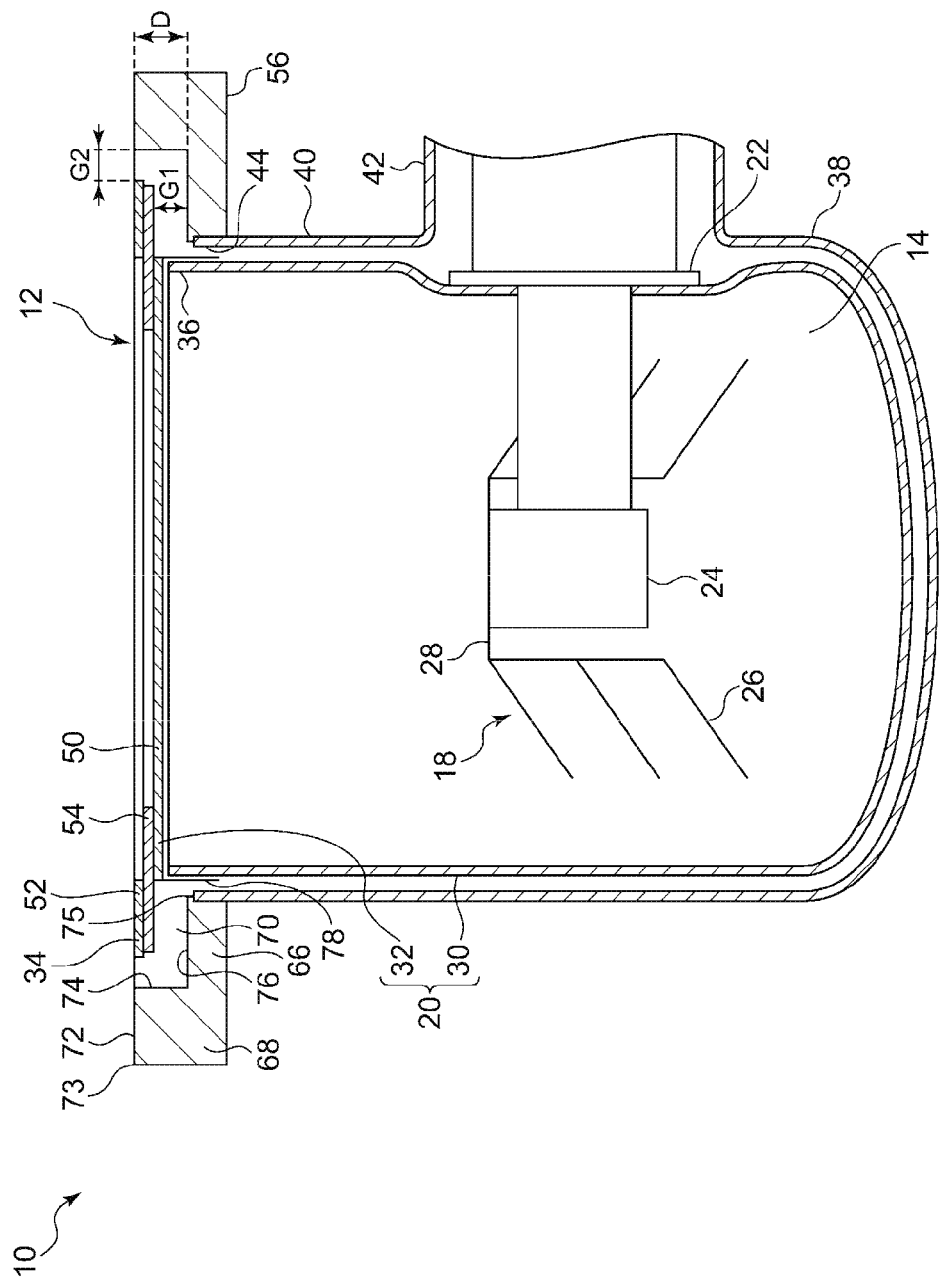
FIG. 1 is a schematic cross-sectional view of a cryopump according to an embodiment of the present invention.

The invention will now be described by reference to the preferred embodiments. This does not intend to limit the scope of the present invention, but to exemplify the invention.

A cryopump typically includes, at an inlet thereof, a cryopanel which is also referred to as, for example, a baffle. Enlargement of such a cryopanel is, in some cases, demanded in order to increase the pumping speed of certain types of gases (for example, moisture). A major portion of the inlet, however, is already occupied by this cryopanel in most cases, leaving not much room for the enlargement.

A configuration with an inlet array extending outside a cryopump, as described above, is considered. Such an extension may prevent a cryopump of this configuration from being mounted on a target chamber thereof depending on a design of the target chamber.

An exemplary object of an aspect of the present invention is to provide a cryopump with a reduced likelihood of interference with the design of a target to be attached to the cryopump.

A cryopump according to an aspect of the present invention includes: a housing including a tubular portion extending in an axial direction toward an inlet of the cryopump; a flange including an inner periphery portion and an outer periphery portion, the inner periphery portion being provided on an outer side, in a radial direction, of an opening end of the tubular portion, the outer periphery portion being configured to attach the cryopump; and an inlet cryopanel positioned at the inlet. The inlet cryopanel includes an extended portion outside the tubular portion in the radial direction. The inner periphery portion and the outer periphery portion form a height difference therebetween in the axial direction. The inlet cryopanel is surrounded by the flange with a clearance in the axial direction formed between the extended portion and the inner periphery portion and with a clearance in the radial direction formed between the extended portion and the outer periphery portion.

According to this aspect, the inlet cryopanel of the cryopump includes the extended portion at the outer side in the radial direction. This increases a projected area observed in the axial direction, thereby increasing the pumping speed of the inlet cryopanel. The height difference is formed between the flange outer periphery portion, provided for the attaching, and the inner periphery portion, and the inlet cryopanel is surrounded by the flange. The height difference of the flange provides a room to accommodate the extended portion of the inlet cryopanel outside the tubular portion of the housing in the radial direction. Such a design meets simultaneously an improved pumping performance of the cryopump and a reduced likelihood of the interference with a target chamber on which the cryopump is to be mounted.

The outer periphery portion may include a mating surface for attaching, the extended portion may be positioned in the axial direction between the mating surface and the inner periphery portion, and the inlet cryopanel may be enclosed in the cryopump.

The extended portion is positioned inside with respect to the mating surface that is for attaching to the flange, and thus, the extended portion does not extend outside the cryopump. The inlet cryopanel enclosed inside the cryopump in this way ensures that the extended inlet cryopanel does not interfere with a target chamber on which the cryopump is to be mounted.

The cryopump may further include a shield panel that extends in the axial direction inside the tubular portion, a gap in the axial direction formed between the shield panel and the inlet cryopanel. The inlet cryopanel may include a skirt for covering the gap.

The gap between the inlet cryopanel and the shield panel may vary according to a manufacturing error. The error causes an individual difference of the cryopump. A quantity of gases flowing into the inside of the shield changes depending on a size of the gap. The quantity of entry of gases is directly related to the pumping speed of the cryopump. That may cause an actual pumping speed to deviate from a design performance. The flow of gases through the gap can be restricted by providing a skirt to cover the gap. A reduction in the quantity of entry of gases by the restriction also reduces an individual difference in the quantity of entry of gases accordingly. This, as a result, can also reduce an individual difference in the pumping speed.

The inlet cryopanel may include a center portion and heat transfer paths, the center portion being surrounded by the extended portion, the heat transfer paths being between the extended portion and the center portion. The extended portion may include width extensions in proximity to the heat transfer paths.

A large sized cryopanel places a heavy load on a cooling source thereof. Proximity to a heat transfer path is advantageous for cooling in comparison with remoteness therefrom. Hence, providing width extensions in proximity to the heat transfer paths for the inlet cryopanel can restrict a thermal disadvantage and further enlarge the cryopanel area.

The outer periphery portion may be configured to fit the inlet of the cryopump to an opening having a different shape from the inlet, the opening provided with a target to be attached to the cryopump.

This allows the cryopump to be mounted on the opening of a desired target chamber.

A cryopump according to another aspect of the present invention includes: a low-temperature cryopanel; a high-temperature cryopanel provided outside the low-temperature cryopanel; and a housing provided outside the high-temperature cryopanel. The high-temperature cryopanel includes an extended portion extending outward. The housing includes a stepped flange surrounding the extended portion.

According to this aspect, the stepped flange of the cryopump housing provides a room to accommodate the extended portion of the high-temperature cryopanel. Hence, an improved pumping performance of the cryopump and a reduced likelihood of the interference with a target chamber on which the cryopump is to be mounted can be met simultaneously.

A cryopump according to still another aspect of the present invention includes: a housing including a tubular portion extending in an axial direction toward an inlet of the cryopump; an inlet cryopanel positioned at the inlet; and a shield panel that extends in the axial direction inside the tubular portion, a gap in the axial direction formed between the shield panel and the inlet cryopanel. The inlet cryopanel includes a skirt for covering the gap.

A cryopump according to yet another aspect of the present invention includes: a low-temperature cryopanel; and a high-temperature cryopanel provided outside the low-temperature cryopanel. The high-temperature cryopanel includes an inlet cryopanel and a shield panel. A gap is formed between the inlet cryopanel and an opening end of the shield panel. The inlet cryopanel includes a skirt for restricting a flow of gases through the gap.

FIG. 1 is a schematic cross-sectional view of a cryopump 10 according to an embodiment of the present invention. The cryopump 10 is mounted on a vacuum chamber of, for example, an ion implantation apparatus or a sputtering apparatus and used to increase the vacuum level inside the vacuum chamber to a level demanded by a desired process.

The cryopump 10 includes an inlet 12 to receive gases. The inlet 12 is an entrance to an internal space 14 of the cryopump 10. Gases to be pumped flow from the vacuum chamber on which the cryopump 10 is mounted, through the inlet 12, into the internal space 14 of the cryopump 10.

Figure 2:
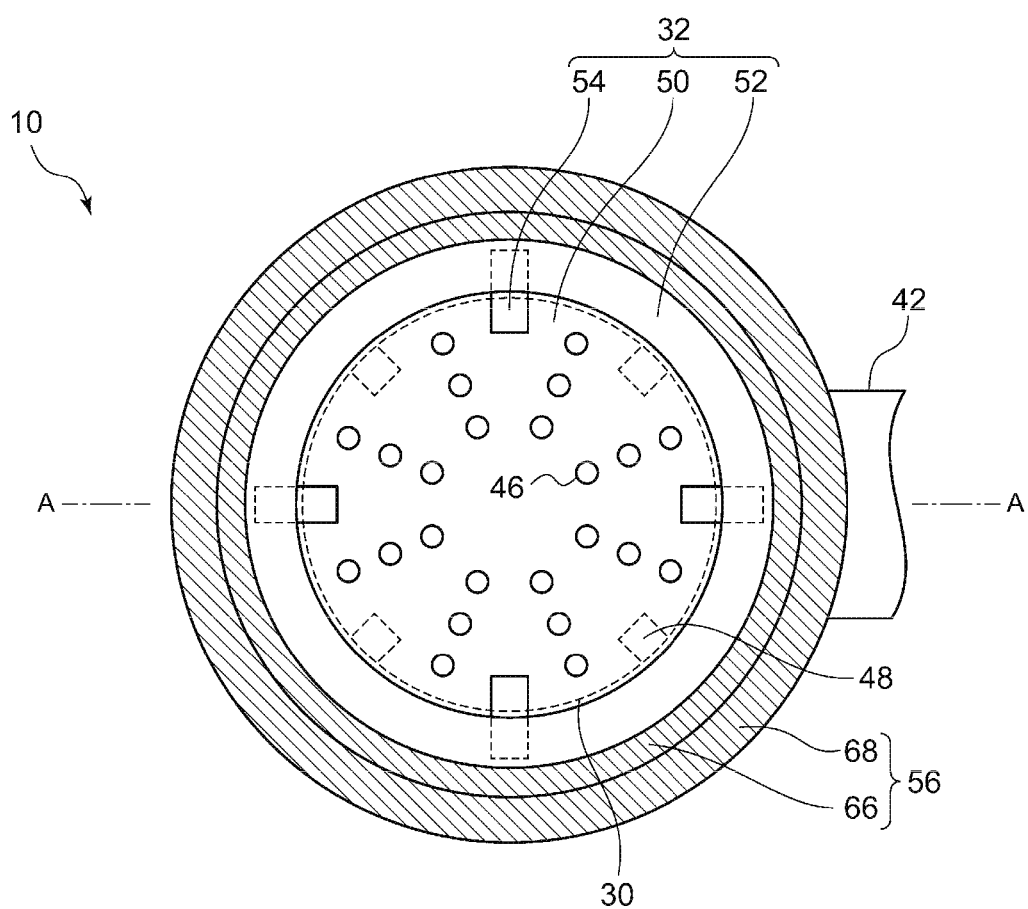
FIG. 2 is a top view of the cryopump illustrated in FIG. 1.
Figure 3:
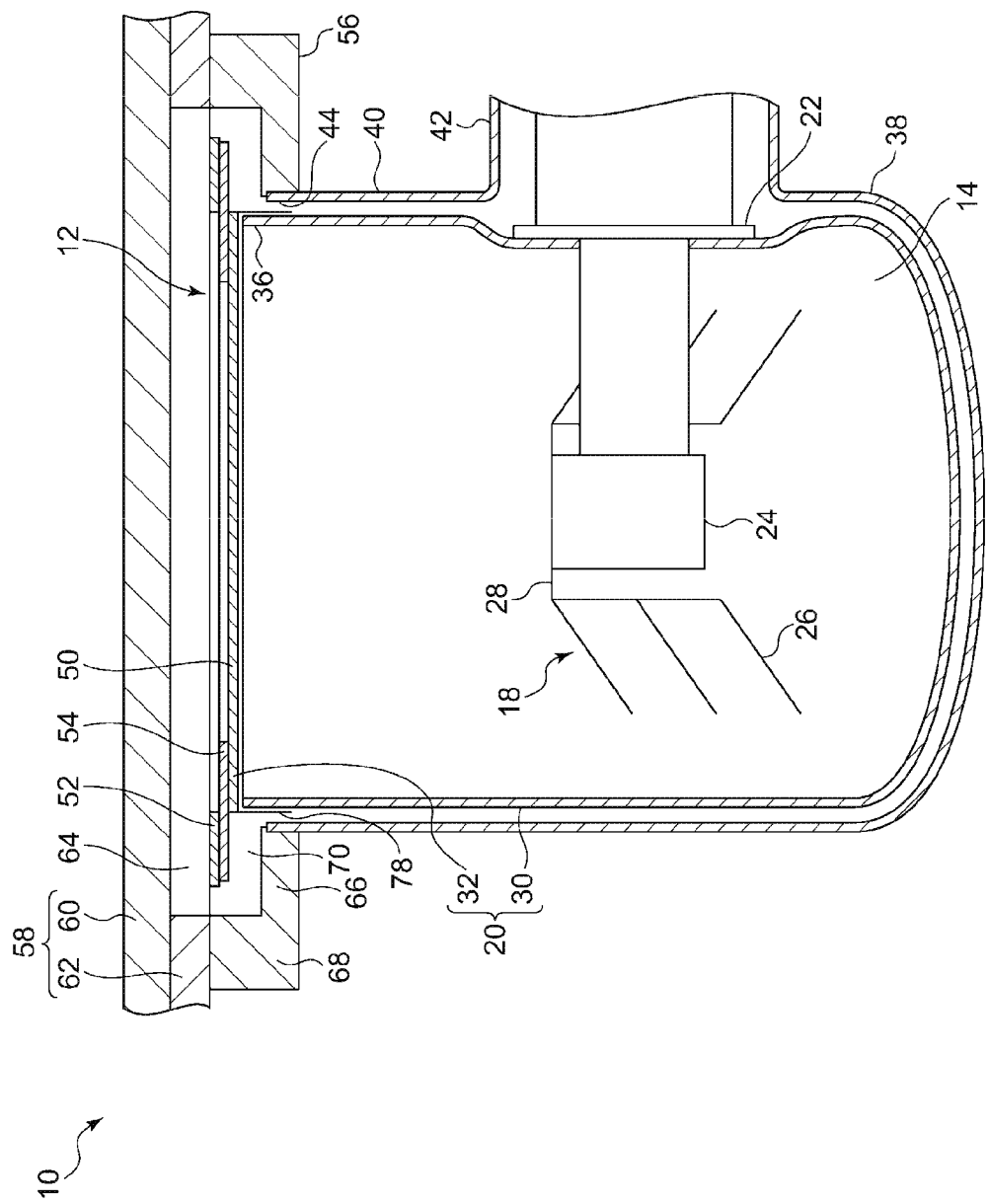
FIG. 3 is a diagram of the cryopump, illustrated in FIG. 1, as mounted.
Figure 4:
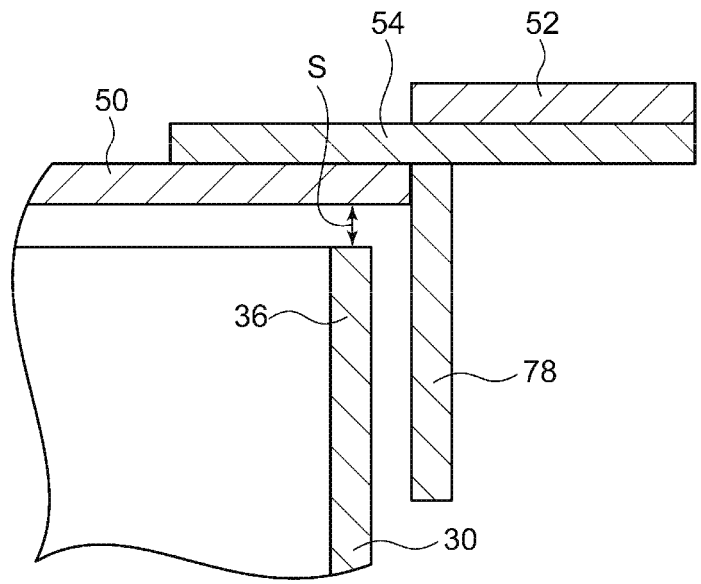
FIG. 4 is a partially enlarged cross-sectional view of the cryopump illustrated in FIG. 1.

A configuration of the cryopump 10 will be described with reference to FIG. 1 as well as to FIGS. 2 to 4. FIG. 1 is a cross-sectional view including a central axis of the internal space 14 of the cryopump 10 and a refrigerator 16. FIG. 1 is a cross-sectional view along line A-A in FIG. 2. FIG. 2 is a diagram of the cryopump 10 observed from above. FIG. 2 illustrates the inlet 12 and a configuration of an inner side thereof. FIG. 3 is a diagram of the cryopump 10 as mounted on a vacuum chamber. FIG. 4 is a partially enlarged cross-sectional view of a portion of the cryopump 10 illustrated in FIG. 1, or specifically, a periphery of the inlet 12.

Note that terms "axial direction" and "radial direction" may be used herein to facilitate understanding of a positional relationship among components of the cryopump 10. The axial direction represents a direction through the inlet 12, and the radial direction represents a direction along the inlet 12. For convenience, relative closeness to the inlet 12 in the axial direction may be described by terms such as "upper" and "upward," and relative remoteness therefrom may be described by terms such as "lower" and "downward." In other words, relative remoteness from the bottom of the cryopump 10 may be described by terms such as "upper" and "upward," and relative closeness thereto may be described by terms such as "lower" and "downward," both in the axial direction. Relative closeness to a center of the inlet 12 in the radial direction may be described by terms such as "inner" and "inside," and relative closeness to the circumference of the inlet 12 in the radial direction may be described by terms such as "outer" and "outside." It should be noted here that these terms are not related to a position of the cryopump 10 as mounted on a vacuum chamber. For example, the cryopump 10 may be mounted on a vacuum chamber with the inlet 12 facing downward in the vertical direction.

The cryopump 10 includes a refrigerator 16, a low-temperature cryopanel 18, and a high-temperature cryopanel 20. The refrigerator 16 is a cryogenic refrigerator, such as a Gifford-McMahon type refrigerator (generally called a GM refrigerator). The refrigerator 16 is a two-stage refrigerator including a first stage 22 and a second stage 24. The refrigerator 16 is configured to cool the first stage 22 to a first temperature level and the second stage 24 to a second temperature level. The second temperature level is lower than the first temperature level. For example, the first stage 22 is cooled to approximately 65 K to 120 K, and preferably to 80 K to 100 K, while the second stage 24 is cooled to approximately 10 K to 20 K.

The cryopump 10 illustrated in FIG. 1 is a so-called horizontal-type cryopump. A horizontal-type cryopump is generally a cryopump arranged such that the refrigerator 16 intersects (orthogonally in general) with the central axis of the internal space 14 of the cryopump 10. The present invention is also applicable to a vertical-type cryopump in a similar manner. A vertical-type cryopump is a cryopump with a refrigerator arranged along the axial direction of the cryopump.

The low-temperature cryopanel 18 is arranged in a center portion of the internal space 14 of the cryopump 10. The low-temperature cryopanel 18 includes, for example, a plurality of panel members 26. Each of the panel members 26 has a shape of the side surface of a truncated cone, i.e., an umbrella-like shape. Typically, an adsorbent (not shown) such as charcoal is provided on each of the panel members 26. The adsorbent is, for example, attached to the back face of the panel members 26. The panel members 26 are attached to a panel attachment member 28. The panel attachment member 28 is attached to the second stage 24. The low-temperature cryopanel 18 is thermally connected to the second stage 24 in this way. Hence, the low-temperature cryopanel 18 is cooled to the second temperature level.

The high-temperature cryopanel 20 is provided outside the low-temperature cryopanel 18. The high-temperature cryopanel 20 includes a radiation shield 30 and an inlet cryopanel 32, and encloses the low-temperature cryopanel 18. The high-temperature cryopanel 20 includes an extension panel 34 extending outward. The extension panel 34 forms a part of at least one of the radiation shield 30 and the inlet cryopanel 32. The high-temperature cryopanel 20 is thermally connected to the first stage 22. The high-temperature cryopanel 20 is cooled to the first temperature level.

The radiation shield 30 is a cryopanel provided mainly to protect the low-temperature cryopanel 18 from radiant heat emitted from a housing 38 of the cryopump 10. The radiation shield 30 thus can be also called a shield panel. The radiation shield 30 is located between the housing 38 and the low-temperature cryopanel 18, and encloses the low-temperature cryopanel 18.

The radiation shield 30 has an open upper end in the axial direction, and includes a shield opening end 36 at the inlet 12. The radiation shield 30 has a tubular shape (for example, cylindrical) with its lower end closed in the axial direction to be formed into a cup-like shape. The radiation shield 30 has a hole in its side for attaching the refrigerator 16, and the second stage 24 is inserted into the radiation shield 30 through the hole. The first stage 22 is fixed to an outer surface of the radiation shield 30 at the outer periphery of the attaching hole. The radiation shield 30 is thermally connected to the first stage 22 in this way.

The radiation shield 30 may be formed as a one-piece tube as illustrated in FIG. 1. Alternatively, a plurality of parts may form a tubular shape as a whole. The plurality of parts may be arranged so as to have a gap between one another. For example, the radiation shield 30 may be segmented into an upper shield and a lower shield, the upper shield being attached to the upper side, in the axial direction, of the first stage 22, the lower shield being attached to the lower side, in the axial direction, of the first stage 22. In this case, the upper shield is a tubular shield panel having an upper end and a lower end that are both open, whereas the lower shield is a tubular shield panel having an open upper end and a closed lower end.

The inlet cryopanel 32 is provided above the low-temperature cryopanel 18 in the axial direction and along the inlet 12 in the radial direction. The inlet cryopanel 32 is fixed to the shield opening end 36 and thermally connected to the radiation shield 30. The inlet cryopanel 32 is provided to pump gases that enter through the inlet 12. Gases (for example, moisture) that condense at temperatures of the inlet cryopanel 32 are trapped on a surface thereof.

The inlet cryopanel 32 is provided also to protect the low-temperature cryopanel 18 from radiant heat emitted from a heat source outside the cryopump 10 (for example, a heat source inside a vacuum chamber on which the cryopump 10 is mounted). The entry of molecules of gases, in addition to the radiant heat, is also limited. The inlet cryopanel 32 occupies a part of an opening area of the inlet 12 so as to limit a flow of gases through the inlet 12 into the internal space 14 to a desired quantity. The inlet cryopanel 32 covers a major portion of the inlet 12.

The inlet cryopanel 32 is a plate member that covers an opening of the radiation shield 30, as illustrated in FIG. 2. The inlet cryopanel 32 is circular similarly to a shape of a section of the radiation shield 30. Here, the inlet cryopanel 32 may be in any appropriate configuration instead of a circular plate member. The inlet cryopanel 32 may include, for example, a louver structure, a chevron structure, or a lattice structure. In FIG. 2, an inlet flange 56 surrounding the inlet cryopanel 32 is shaded to facilitate understanding.

The inlet cryopanel 32 includes a cooling plate 50 and an extension plate 52. The cooling plate 50, surrounded by the extension plate 52, constitutes a center portion of the inlet cryopanel 32. The cooling plate 50 covers the opening of the radiation shield 30. The inlet cryopanel 32 is extended outward in the radial direction by providing the extension plate 52. The cooling plate 50 is a disk, and the extension plate 52 is an annular member (for example, a ring). In the present embodiment, the extension plate 52 is equivalent to the extension panel 34 described above.

A large number of openings 46 are formed in the inlet cryopanel 32 in order to allow the gases to flow therethrough. The openings 46 are formed in the cooling plate 50. The openings 46 may be formed in any shape, for example, a circular shape. The openings 46 are not formed in the extension plate 52.

The inlet cryopanel 32 is attached to plate mounts 48 of the shield opening end 36. The plate mounts 48 are each a protrusion extending from the shield opening end 36 inward in the radial direction and are formed at regular intervals (for example, every 90°) in a circumferential direction. The inlet cryopanel 32 is fixed to the plate mounts 48 in an appropriate manner. For example, the plate mounts 48 each have a bolt hole (not shown) to allow a periphery of the inlet cryopanel 32 to be bolted onto the plate mounts 48.

The inlet cryopanel 32 includes extension plate supports 54. The extension plate supports 54 are provided to attach the extension plate 52 to the cooling plate 50. The extension plate supports 54 thermally connect the cooling plate 50 and the extension plate 52 therebetween. The extension plate supports 54 are provided at regular intervals (for example, every 90°) in the circumferential direction. The extension plate supports 54 are provided at different positions from the plate mounts 48 in the circumferential direction.

The extension plate supports 54 are each, for example, a small sized plate member. One half of each of the extension plate supports 54 is attached to the cooling plate 50, and the other half thereof is attached to the extension plate 52. The extension plate supports 54 are each fixed in an appropriate manner including bolt attachment.

The cryopump 10 includes the housing 38 as illustrated in FIG. 1. The housing 38 is a vacuum vessel to isolate the inside of the cryopump 10 from the outside thereof. The housing 38 is configured to be gastight to maintain a pressure of the internal space 14 of the cryopump 10. The housing 38 accommodates the high-temperature cryopanel 20 and the refrigerator 16 therein. The housing 38 is provided outside the high-temperature cryopanel 20 and encloses the high-temperature cryopanel 20. The housing 38 also accommodates the refrigerator 16.

The housing 38 is fixed to a portion having an outside environmental temperature (for example, a high-temperature portion of the refrigerator 16) so as to be kept away from contact with low-temperature portions of the high-temperature cryopanel 20 and the refrigerator 16. An outer surface of the housing 38 is exposed to an outside environment and, hence, has a temperature (for example, around a room temperature) higher than that of the high-temperature cryopanel 20, which is being cooled.

The housing 38 includes a tubular portion 40 and a refrigerator containing portion 42. The tubular portion 40 extends toward the inlet 12 in the axial direction. The tubular portion 40 is open at an upper end thereof in the axial direction and includes a housing opening end 44 at the inlet 12. The tubular portion 40 has a tubular shape (for example, cylindrical) with its lower end closed in the axial direction to be formed into a cup-like shape. The refrigerator containing portion 42, which is tubular, protrudes from a side of the tubular portion 40. The tubular portion 40 accommodates the radiation shield 30, and the refrigerator containing portion 42 accommodates the refrigerator 16.

The tubular portion 40 and the radiation shield 30 are both formed as substantially cylindrical shapes and are arranged coaxially. The inner diameter of the tubular portion 40 is larger than the outer diameter of the radiation shield 30 to some extent. Therefore, the radiation shield 30 is arranged in the tubular portion 40 without contact, spaced reasonably apart from the inner surface of the tubular portion 40. That is, the outer surface of the radiation shield 30 faces the inner surface of the tubular portion 40. The shapes of the tubular portion 40 and the radiation shield 30 are not limited to cylindrical but may be tubes having a rectangular or elliptical cross section, or any other cross section. Typically, the shape of the radiation shield 30 is analogous to the shape of the inner surface of the tubular portion 40.

The housing opening end 44 is below the shield opening end 36 in the axial direction. That is, the shield opening end 36 extends upward toward the inlet cryopanel 32 and beyond the housing opening end 44.

The housing 38 is provided with the inlet flange 56 at the housing opening end 44. The inlet flange 56 is a flange for attaching the cryopump 10 to a target vacuum chamber thereof. The inlet flange 56 defines the inlet 12 of the cryopump 10. The inlet flange 56 extends outward in the radial direction from the upper end of the tubular portion 40 of the housing 38. The inlet flange 56 is provided along the entire circumference of the housing 38.

As illustrated in FIG. 3, when a gate valve 58 is provided at an opening of a vacuum chamber, the cryopump 10 is mounted on the gate valve 58. In this case, the gate valve 58 is positioned above the inlet cryopanel 32 in the axial direction. The gate valve 58 is closed when, for example, the cryopump 10 is regenerated, and opened when the vacuum chamber is evacuated by the cryopump 10.

The gate valve 58 typically includes a moveable valve element 60, a drive unit (not shown) for opening and closing the moveable valve element 60, and a valve housing 62 for movably accommodating the moveable valve element 60. The valve housing 62 has a gate valve opening 64 to be opened and closed by the moveable valve element 60.

The inlet flange 56 is configured to fit the inlet 12 of the cryopump 10 to the gate valve opening 64. The inlet flange 56 is attached to an outer periphery portion of the valve housing 62 surrounding the gate valve opening 64. The shape of the inlet flange 56 coincides with the shape of the attaching portion of the gate valve 58 when observed in the axial direction. The attaching portion, thus, comes in contact with the inlet flange 56, maintaining the gas tightness of the inside.

Specifically, the outer periphery portion 68 of the inlet flange 56 is configured to fit the inlet 12 to the gate valve opening 64. An outline of the outer periphery portion 68 has a common shape with an outline of the gate valve opening 64. For example, when the gate valve opening 64 is circular, the outer periphery portion 68 is similarly circular. When the gate valve opening 64 is rectangular, the outer periphery portion 68 is similarly rectangular.

The inlet flange 56 includes an inner periphery portion 66 and the outer periphery portion 68. A height difference D in the axial direction is formed between the inner periphery portion 66 and the outer periphery portion 68. The inner periphery portion 66 is provided on the outer side of the housing opening end 44 in the radial direction. The outer periphery portion 68 is provided to mount the cryopump 10, and is connected to the housing 38 through the inner periphery portion 66.

The outer periphery portion 68 protrudes upward in the axial direction on the outer side, in the radial direction, of the inner periphery portion 66. The outer periphery portion 68 is thicker in the axial direction than the inner periphery portion 66. An upper end surface of the outer periphery portion 68 is a mating surface 72 for the mounting. The mating surface 72 comes in contact with a periphery of the gate valve opening 64 to attach the inlet flange 56 to the valve housing 62 of the gate valve 58. A lower surface of the outer periphery portion 68 is flush with a lower surface of the inner periphery portion 66.

The height difference D of the inlet flange 56 is formed by the mating surface 72 and an upper surface of the inner periphery portion 66. The height difference D forms a flange recess 70 to receive the extension plate 52 of the inlet cryopanel 32. The height difference D is located midway between a corner 73 on the upper end of the outer side of the inlet flange 56 and a corner 75 on the upper end of the inner side of the inlet flange 56. In other words, the height difference D is located between an outer circumferential surface and an inner circumferential surface of the inlet flange 56 in the radial direction when observed from the upper surface of the inlet flange 56.

The flange recess 70 is an annular space to accommodate the extension plate 52 in the cryopump 10, and it constitutes a part of the internal space 14 of the cryopump 10. The flange recess 70 is formed along the entire circumference of the inlet flange 56. An axial clearance G1 is formed in the flange recess 70 between the inner periphery portion 66 and the extension plate 52. A radial clearance G2 is formed in the flange recess 70 between the outer periphery portion 68 and the extension plate 52. In this way, the inlet cryopanel 32 is surrounded by the inlet flange 56 such that the extension plate 52 is kept away from contact with the inlet flange 56.

The axial clearance G1 and the radial clearance G2 are preferably large in order to ensure noncontact with the inlet flange 56. A large clearance reduces radiant heat that is emitted by the inlet flange 56 and reaches the extension plate 52. A small clearance is favorable for preventing gases from flowing into the clearance. In light of these conditions, the axial clearance G1 and the radial clearance G2 are preferably larger than, for example, 5 mm.

An inner circumferential surface of the outer periphery portion 68 is orthogonal to the upper surface of the inner periphery portion 66. Hence, the height difference D is a step. The inner circumferential surface of the outer periphery portion 68 is a flange recess side surface 74, and the upper surface of the inner periphery portion 66 is a flange recess bottom surface 76. Hence, the axial clearance G1 is formed between the flange recess bottom surface 76 and a lower surface of the extension plate 52, and the radial clearance G2 is formed between the flange recess side surface 74 and an outer end of the extension plate 52 in the radial direction.

Here, the flange recess side surface 74 may be tilted relative to the flange recess bottom surface 76 to obtain continuously changing heights from the flange recess bottom surface 76 to the mating surface 72 and form height differences D at the inlet flange 56. In this case, the axial clearance G1 and the radial clearance G2 are formed similarly in reference to the extension plate 52 in the flange recess 70.

The extension plate 52 is positioned midway between the mating surface 72 and the flange recess bottom surface 76 in the axial direction. The extension plate 52 extends in the radial direction, from a position corresponding to that of the shield opening end 36, over the housing opening end 44 toward the flange recess side surface 74. In this way, the inlet cryopanel 32 is enclosed in the cryopump 10. In the illustrated example, an upper surface of the extension plate 52 is substantially flush with the mating surface 72 in the axial direction. The upper surface of the extension plate 52 may be positioned upper or lower than the mating surface 72 to some extent.

Note that there is a gap between the radiation shield 30 and the inlet cryopanel 32 in the axial direction. Specifically, there is a gap S between the shield opening end 36 and the cooling plate 50 as illustrated in FIG. 4. The inlet cryopanel 32 includes a skirt 78 to cover the gap S. The skirt 78 is provided to restrict a flow of gases through the gap S.

The skirt 78 is a short tube surrounding the cooling plate 50. The skirt 78 and the cooling plate 50 form a one-piece structure resembling a circular tray with the cooling plate 50 as a bottom surface of the tray. This circular tray structure is arranged to put a lid on the radiation shield 30. Hence, the skirt 78 protrudes downward from the cooling plate 50 in the axial direction and in proximity to the gap S in the radial direction. A distance between the skirt 78 and the gap S (or the shield opening end 36) in the radial direction is, for example, about a dimensional tolerance of the radiation shield 30.

The skirt 78 extends downward in the axial direction beyond the gap S into a space between the radiation shield 30 and the housing 38. The skirt 78 is closer to the radiation shield 30 than to the housing 38 in the radial direction. The skirt 78 and the shield opening end 36 overlap with each other in the radial direction in this way, and form, in a sense, a labyrinth structure (or a bent gap). The flow of gases through the gap S can be minimized with such a labyrinth structure. Here, the skirt 78 and the shield opening end 36 may be at least partially in contact with each other. The skirt 78 may be located inside the shield opening end 36 in the radial direction.

The gap S between the inlet cryopanel 32 and the radiation shield 30 may vary according to a manufacturing error. Such an error may be reduced by precise machining and assembly of components, which may not be practical, though, because of possible increases in manufacturing costs. The error may generate an individual difference of the cryopump 10. A quantity of gases flowing into the inside of the radiation shield 30 changes depending on a size of the gap S. The quantity of entry of gases is directly related to the pumping speed of the cryopump 10. A gap S which is excessively large or small causes an actual pumping speed to deviate from a design performance thereof. The flow of gases through the gap S is restricted by covering the gap S with the skirt 78, which reduces the individual difference. This, as a result, also reduces an individual difference in the pumping speed of cryopumps in reference to the design performance.

An explanation on the operations of the cryopump 10 with the aforementioned configuration will be given below. Before activating the cryopump 10, the inside of the vacuum chamber is first roughly evacuated to approximately 1 Pa by using an appropriate roughing pump. The cryopump 10 is then activated. The operation of the refrigerator 16 cools the first stage 22 and the second stage 24, and that also cools the low-temperature cryopanel 18 and the high-temperature cryopanel 20 thermally connected to these stages.

The inlet cryopanel 32 cools molecules of the gases flowing from the vacuum chamber into the cryopump 10 to cause gases (for example, moisture) having vapor pressures that are sufficiently reduced by a cooling temperature of the inlet cryopanel 32 to condense on a surface of the inlet cryopanel 32 for removal. Gases having vapor pressures that are not sufficiently reduced by the cooling temperature of the inlet cryopanel 32 pass through the inlet cryopanel 32 to enter the inside of the radiation shield 30. Of the molecules of the gases that have entered, gases having vapor pressures that are sufficiently reduced by a cooling temperature of the low-temperature cryopanel 18 are condensed on a surface of the low-temperature cryopanel 18 for removal. Gases (for example, hydrogen) having vapor pressures that are not sufficiently reduced by this cooling temperature are adsorbed, for removal, onto an adsorbent that is attached to the surface of the low-temperature cryopanel 18 and cooled. In this way, the cryopump 10 can attain a desired level of vacuum in the vacuum chamber.

According to an embodiment of the present invention, the inlet cryopanel 32 is extended outward in the radial direction by providing the extension plate 52. An effective area (in other words, a projected area when observed in the axial direction) contributing to the pumping speed is enlarged in this way. Hence, the pumping speed of the inlet cryopanel 32 (for moisture, for example) can be improved.

The extension plate 52 is arranged at the flange recess 70 of the inlet flange 56, and the inlet cryopanel 32 is enclosed in the cryopump 10. The height difference D provided at the inlet flange 56 allows the inlet cryopanel 32 to be enlarged without the inlet cryopanel 32 extending above the inlet flange 56. The extended portion of the inlet cryopanel 32 arranged inside the cryopump eliminates a risk of an interference with the gate valve 58. Hence, the cryopump 10 can be mounted on a desired gate valve 58 with the inlet cryopanel 32 extended.

The cryopump 10 is preferable for applications that predominantly pump water. The cryopump 10 can pump water efficiently because the inlet cryopanel 32 is extended. In such an application, a pumping speed for gases that are trapped at temperatures lower than those for water can be lower than the pumping speed for water. Such a low pumping speed can be attained by a small sized cryopump.

The state of affairs of the industry, however, is that inlet aperture sizes of cryopumps define a product lineup of cryopumps. Manufacturers of cryopumps typically manufacture and sell cryopumps of standard specifications according to aperture sizes at 2-inch or 4-inch intervals, for example, at 8, 10, and 12 inches. Hence, the selection of a cryopump to be used depends totally on the aperture size of its target chamber.

According to the cryopump 10 of the present embodiment, however, the inlet flange 56 is adapted to a target chamber. Hence, the use of the adapted inlet flange 56 allows a cryopump of a small aperture size to be mounted on a gate valve of a large aperture size. The use of a small sized cryopump contributes to a cost reduction of a vacuum system. The inlet flange 56 adapted to, for example, a 12-inch gate valve 58 is provided on an 8-inch cryopump 10. This allows the 8-inch cryopump 10 to be mounted on the 12-inch gate valve 58.

The above has described the present invention based on an embodiment. Those skilled in the art will appreciate that the present invention is not limited to the embodiment described above, that various design changes and modifications are possible, and that such modifications are also within the scope of the present invention.

Figure 5:
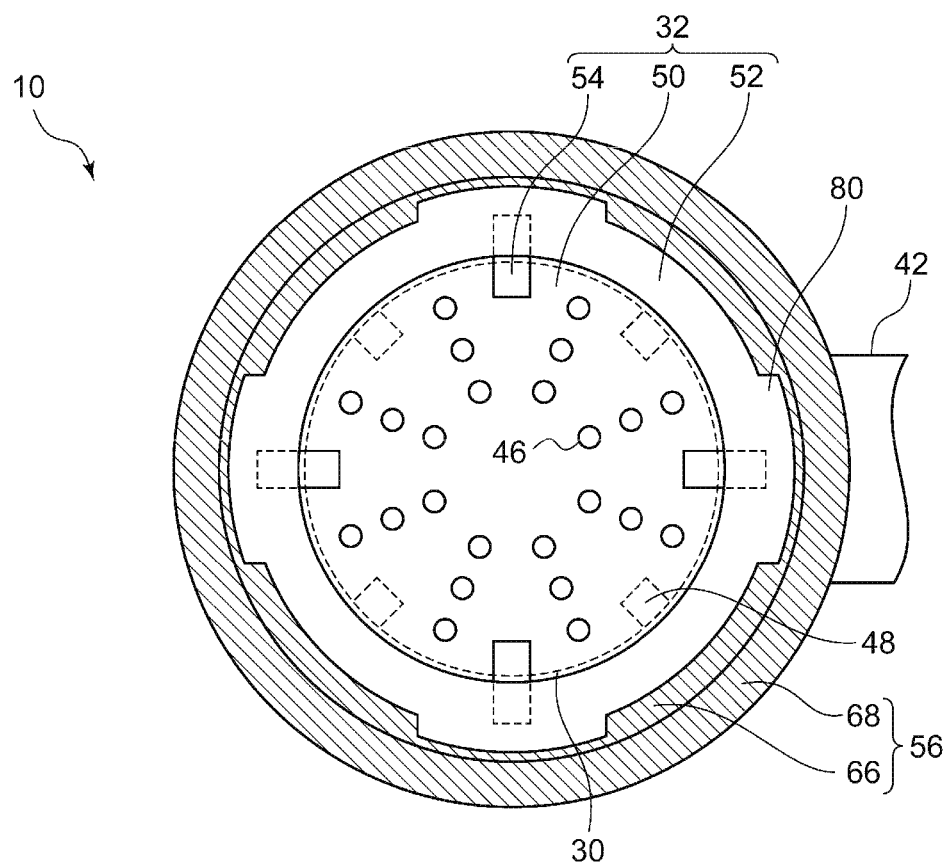
FIG. 5 is a schematic diagram of a cryopump according to another embodiment of the present invention.

FIG. 5 is a schematic diagram of a cryopump 10 according to another embodiment of the present invention. This cryopump 10 is different from the embodiment described above in that width extensions 80 are included in an extension plate 52. The width extensions 80 extend from the extension plate 52 outward in the radial direction in proximity to extension plate supports 54 as illustrated in FIG. 5. The width extensions 80 further increase the effective area of an inlet cryopanel 32. The extension plate supports 54 form heat transfer paths to cool the extension plate 52. Providing the width extensions 80 in proximity to the extension plate supports 54 can restrict a thermal disadvantage to a relatively low level.

In contrast, the extension plate 52 may include a width reduction as appropriate. The extension plate 52 may also have a discontinuity (in other words, the extension plate 52 may be discontinuous along the entire circumference).

When a gate valve is not provided at an opening of a vacuum chamber, an inlet flange 56 may be configured to fit an inlet 12 of the cryopump 10 to the opening of the vacuum chamber. In such an approach, the cryopump 10 may be attached directly to the opening of the vacuum chamber. The adaptation of the inlet flange 56 allows the cryopump 10 to be attached to an opening of a target chamber having a difference in shape from the inlet 12. The cryopump 10 can be attached to, for example, an opening of a target chamber with at least a part of its diameter larger than that of the inlet 12.

Similarly, the inlet cryopanel 32 may be provided with a different configuration. For example, if the inlet cryopanel 32 includes a louver structure, the extended portion of the inlet cryopanel 32 may be one or more louver blades. Such a blade or blades may be provided, in lieu of the annular extension plate 52, outside a shield opening end 36 or the housing opening end 44 in the radial direction.

A radiation shield 30, in lieu of the extension plate 52, may include an extension panel 34. The radiation shield 30 may include, for example, an extension shield portion that extends from the shield opening end 36 outward in the radial direction. A similar effect to that of the extension plate 52 can be obtained in this way.

In addition, an upper portion of the radiation shield 30 in the axial direction may be larger in diameter than a lower portion thereof. In other words, the radiation shield 30 may be shaped to have an edge, at the opening side, that is enlarged outward in the radial direction. The enlarged portion of the radiation shield 30 may be accommodated in a flange recess 70. In this case, the extension plate 52 may be located inside the radiation shield 30 in the radial direction.

If the inlet cryopanel 32 does not include the extension plate 52, a skirt 78 may be provided on a cooling plate 50. Alternatively, instead of the skirt 78 provided on the cooling plate 50, the inlet cryopanel 32 may be fixed on the shield opening end 36 to eliminate the gap S.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-021289, filed on Feb. 2, 2012, the entire content of which is incorporated herein by reference.

What is claimed is:

1. A cryopump to be mounted on a gate valve including a movable valve element and a valve housing for movably accommodating the movable valve element, the cryopump comprising:

a cryopump housing comprising a tubular portion extending in an axial direction toward an inlet of the cryopump;

a cryopump inlet flange configured to attach the cryopump housing to the valve housing, the cryopump inlet flange comprising an inner periphery portion and an outer periphery portion, the inner periphery portion being provided on an outer side, in a radial direction, of an opening end of the tubular portion, the outer periphery portion being configured to attach the cryopump to the valve housing and comprising an inner circumferential surface being exposed to the inlet of the cryopump, wherein a flange recess is defined by an upper surface of the inner periphery portion and the exposed inner circumferential surface of the outer periphery portion; and an inlet cryopanel positioned at the inlet and comprising an extended portion extending into the flange recess in the radial direction, an outer circumference of the extended portion being positioned inward of the inner circumferential surface of the outer periphery portion in the radial position and positioned above the upper surface of the inner periphery portion in the axial direction, wherein the outer circumference of the extended portion directly faces the exposed inner circumferential surface of the outer periphery portion.

2. The cryopump according to claim 1, wherein the outer periphery portion comprises a mating surface for attaching the cryopump inlet flange to the valve housing, the extended portion is positioned in the axial direction between the mating surface and the inner periphery portion, and the inlet cryopanel is enclosed in the cryopump.

3. The cryopump according to claim 1, further comprising a shield cryopanel that extends in the axial direction inside the tubular portion, a gap in the axial direction formed between the shield cryopanel and the inlet cryopanel; and a cryogenic refrigerator comprising a first stage cooled to a cryogenic temperature, wherein the inlet cryopanel comprises a skirt for covering the gap, and wherein the shield cryopanel, the inlet cryopanel, and the skirt are thermally connected to the first stage such that the shield cryopanel, the inlet cryopanel, and the skirt are cooled to the cryogenic temperature.

4. The cryopump according to claim 1, wherein the inlet cryopanel comprises a center portion and a heat transfer path, the center portion being surrounded by the extended portion, the heat transfer path being between the extended portion and the center portion, and the extended portion comprises a first extension in proximity to the heat transfer path and a second extension circumferentially adjacent to the first extension, the first extension having a first circumference located at a first distance form a center point of the center portion and the second extension having a second circumference located at a second distance from the center point, the second distance being less than the first distance.

5. The cryopump according to claim 1, wherein the outer periphery portion is configured to fit the inlet of the cryopump to an opening of the gate valve, the opening having a different shape from the inlet.

6. The cryopump according to claim 1, wherein the outer periphery portion comprises a mating surface for attaching the cryopump inlet flange to the valve housing, and the extended portion is an extension plate having an extension plate upper surface that is substantially flush with the mating surface in the axial direction.

7. The cryopump according to claim 1, wherein the inlet cryopanel comprises a center portion surrounded by the extended portion, and the extended portion is an extension plate having an extension plate upper surface positioned above an upper surface of the center portion in the axial direction.

8. The cryopump according to claim 1, wherein the inlet cryopanel comprises a center portion surrounded by the extended portion and a connecting member connecting the center portion to the extended portion, the connecting member having a connecting member upper surface fixed to the extended portion and a connecting member lower surface fixed to the center portion.

9. The cryopump according to claim 1, wherein the extended portion is a ring-shaped extension plate, and the inlet cryopanel comprises a center plate surrounded by the ring-shaped extension plate such that no gap is formed in the radial direction between the ring-shaped extension plate and the center plate.

10. The cryopump according to claim 1, further comprising a shield cryopanel extending in the axial direction inside the tubular portion toward the inlet of the cryopump and terminating at a shield opening end of the shield cryopanel, the opening end of the tubular portion being positioned below the shield opening end in the axial direction.

11. The cryopump according to claim 1, wherein the valve housing has a gate valve opening to be opened and closed by the moveable valve element, the outer periphery portion comprises a mating surface for attaching the cryopump inlet flange to the valve housing, and an inner outline of the mating surface is coincident with an outline of the gate valve opening.

* * * * *